United States Patent [19]

Miller et al.

[11] Patent Number: 5,272,217

[45] Date of Patent: Dec. 21, 1993

[54] ANISOTROPIC POLYMERS

[75] Inventors: Larry L. Miller; Chuan-Jian Zhong, both of Minneapolis, Minn.

[73] Assignee: Regents of the University of Minnesota, Minneapolis, Minn.

[21] Appl. No.: 849,744

[22] Filed: Mar. 12, 1992

[51] Int. Cl.$^5$ .................... C08F 26/06; C08F 126/06; C08F 226/06

[52] U.S. Cl. .................... 525/326.7; 525/327.1; 525/328.2; 525/328.3; 525/343; 525/350; 525/351; 525/353; 525/375; 525/540; 204/72; 204/73 R; 204/290 R; 205/317

[58] Field of Search ............. 525/540, 326.7, 327.1, 525/328.3, 328.2, 343, 350, 351, 353, 375; 204/290 R, 72, 73 R; 205/317

[56] References Cited

U.S. PATENT DOCUMENTS 4,585,652  4/1986  Miller et al. ............... 424/83

OTHER PUBLICATIONS

M. Watanabe et al, *J. Polymer Sci. Polym. Lett. Ed.,* 19,331,1981.
W. Watanabe et al. *Polymer J.,* 14, 189, 1982.
G. Heywang et al. *Angew. Chem. Int. Ed. Engl.,* 28, 4, 1989.
Zhong et al. *Chem. Mater.,* 1991, 3, 787–788.
J. H. Lupinski et al., *J. Polymer Sci.: Part C,* 16, 1561 (1967).
M. Watanabe et al., *J. Polymer Sci., Polym. Lett. Ed.,* 19, 331 (1981).
R. Oshima et al., *J. Polymer Sci.: Part A: Polymer Chem.,* 25, 2234 (1987).
W. Watanabe et al., *Polymer J.,* 14, 189 (1983).
J. A. Siddiqui et al., *Polymer Comm.,* 28, 90 (1987).
J. Ulanski et al., *Synthetic Metal,* 35, 221 (1990).
R. M. Mostovoy et al., *J. Phys. Chem. Solids,* 50, 541 (1989).
L. L. Miller et al., *Chem. Mater.,* 3, 787 (1991).
A. Skorobogaty et al., *Coord. Chem. Rev.,* 53, 55 (1984).
M. Watanabe et al., *J. Polymer Sci.,* 20, 2669 (1982).
R. I. Stankovic et al., *Eur. Polym. J.,* 26, 675 (1990).
W. Liang et al., *J. Am. Chem. Soc.,* 112, 9666 (1990).
T. H. Schimmel, *Synth. Metals,* 37, 1 (1990).
A. P. Monkman et al., *Solid State Comm.,* 78, 29 (1991).
C. R. Fincher, Jr. et al., *Solid State Comm.,* 27, 489 (1978).
J. Ulanski et al., *Synth. Metals,* 35, 221 (1990).
J. Ulanski et al., *J. Phys. D.: Appl. Phys.,* 20, 1512 (1987).
G. Heywang et al., *Angew. Chem. Int. Ed. Engl.,* 28, 4 (1989).
P. D. Saeva et al., *J. Amer. Chem. Soc.,* 104, 3524 (1982).
J. Richard et al., *J. Chem. Phys.,* 86, 2428 (1987).
V. Cammarata et al., *J. Chem. Soc., Chem. Commun.,* 1290 (1990).
M. G. Kanatzidis, *Chem. Eng. News,* 36 (Dec. 3, 1990).
L. R. Faulkner, *Chem. Eng. News,* 28 (Feb. 27, 1984).

*Primary Examiner*—John Kight, III
*Assistant Examiner*—Richard Jones
*Attorney, Agent, or Firm*—Merchant, Gould, Smith, Edell, Welter & Schmidt

[57] ABSTRACT

Anisotropically conductive solid polymeric complexes are provided of the formula:

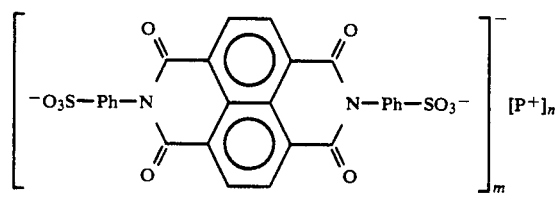

wherein P+ is a cationic polymer, such as a quaternary polyamine, and n and m are selected so that the complex is electrically neutral.

13 Claims, 2 Drawing Sheets

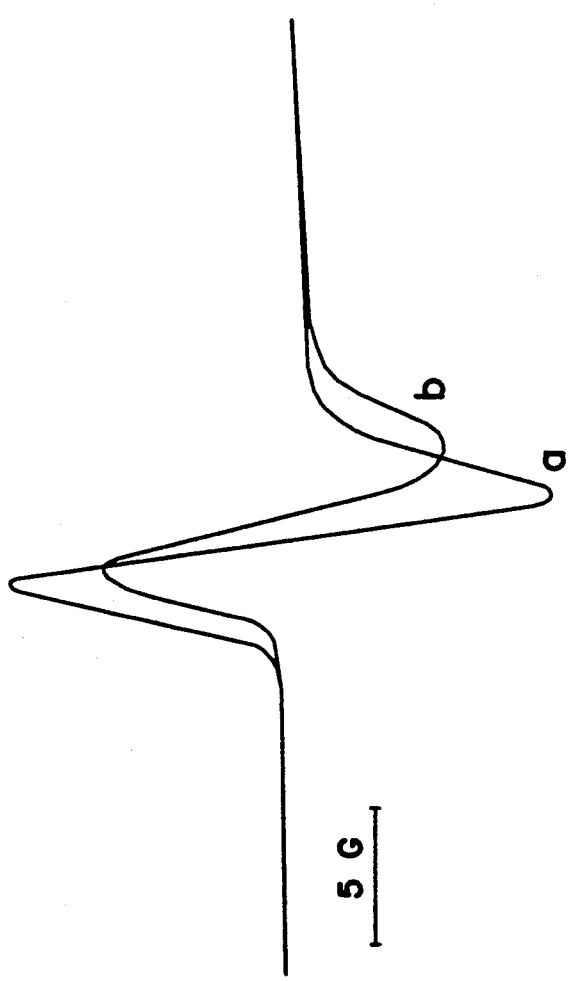

ANISOTROPIC POLYMERS

This invention was made with the support of the U.S. Government under National Science Foundation Grant No. CHE 8717540 and Office of Naval Research Grant No. N00014-90-J-1569. The Government has certain rights in the invention.

BACKGROUND OF THE INVENTION

The electrical conductivity ($\sigma$) of most organic materials at room temperature is quite small ($\sigma < 10^{-10}$ ohm$^{-1}$cm$^{-1}$). Over the last two decades, the synthesis of organic molecules with electrical properties approaching those of metals have been the focus of considerable attention. Because organic polymers generally have elasticity, strength and plasticity, they offer significant advantages over non-polymeric materials in the manufacture of electronic materials. Macromolecular substances can now be tailored to perform as semiconductors or even as true organic metals.

The field of organic metals is dominated by two types of molecular structures: linearly conjugated $\pi$-systems and charge-transfer complexes which form stacks of $\pi$-systems in the solid state. In the former systems, electrons move rapidly along a partially oxidized or reduced molecular chain. Examples of linear $\pi$-conjugated systems are polypyroles, polythiophenes, polyanilines, polyacetylenes and polyarylenes. In charge-transfer complexes, electrons move along a partially oxidized or reduced stack of molecules. In either case, the electrical, optical and magnetic properties are a complex function of the solid state structure, and efforts have been made to prepare and study model compounds for these systems, primarily in solution.

Conductive polymers which comprise conducting stacks of organic ion radicals or charge-transfer complexes are of considerable interest. The construction of macromolecular complexes from cationic polymers and monomeric anion radicals is by far the most widely utilized route to this type of conductive polymer. The polymeric cations can have a quaternary amino function within the polymer which enables the complexation of anionic acceptor molecules.

Tetracyanoquinodimethane (TCNQ) is a powerful $\pi$-molecular acceptor, and its formula is given below:

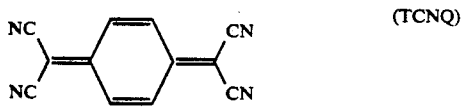

(TCNQ)

The TCNQ radical ion can be formed by one electron addition to TCNQ and forms organic semiconductors with a variety of cations. In some cases, charge transfer salts are formed in which there is a partial charge transfer between a donor molecule and TCNQ. In other cases, stacks are formed which contain TCNQ$^0$ and TCNQ$^-$, along with a polycation. Some of the other acceptors used instead of TCNQ$^0$ in conjunction with polycations are tetracyanoethylene (TCNE) dichlorodicyanoquinone (DDQ) and chloranil (tetrachloroquinone). The formula of DDQ is shown below:

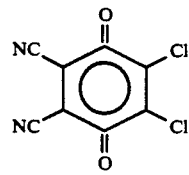

(DDQ)

A macromolecular semiconducting complex may be formed by the addition of a solution of a cationic polymer to a solution of a metal salt of the anion radical, from which the polymeric complex often precipitates.

Polyvinylpyridines (PVP) have a conductivity of the order of $10^{-15}$ $\Omega^{-1}$ cm$^{-1}$ at 300K, and this figure is typical of most other nitrogenous polymers. Quaternization of the nitrogenous moiety to yield a polycation, and doping these with acceptor molecules by the coprecipitation method can lead to an increase in the conductivity of the macromolecule by several orders of magnitude, i.e., from $10^{-15}$ up to $10^{-3}$ $\Omega^{-1}$ cm$^{-1}$ by doping PVP with $I_2$.

In the early 1960s, it was realized that materials of good conductivity could be prepared by mixing a solution of a polycation-halide complex (P+X−) with a solution of Li TCNQ. A careful selection of solvents enabled the immediate precipitation of the exchanged species, P$^+$.TCNQ$^{\pm}$. Close inspection of these polymeric salts revealed that the polycation-TCNQ$^{\pm}$ polymers were actually poorly conducting, and that the presence of TCNQ was central to the presence of conductivity in these polymeric salts.

The conductivity of the P$^+$TCNQ$^{\pm}$ complexes (simple salts) can now be adjusted by the introduction of TCNQ$^0$ into simple salts to form mixed-valence species (complex salts) yielding values as high as $10^{-3}$ $\Omega^{-1}$ cm$^{-1}$, (or $10^{-3}$ S cm$^{-1}$), e.g., as reported by J. H. Lupinski et al., *J. Polymer Sci, Part C*, 561 (1967). Complex salts are prepared by dissolving the simple salt and TCNQ in dimethylformamide and then evaporating the dimethylformamide under reduced pressure. The molar ratios of both TCNQ$^{\pm}$ to P$^+$, and TCNQ$^0$ to TCNQ$^{\pm}$ determine the electrical characteristics of the resultant polymer For example, T. Kamiya et al., *J. Polym. Sci, Polym. Lett. Ed.*, 19, 331 (1981) have shown that the conductivities of typical ionene-type simple salts of (5), (6) and (7), of $7.14 \times 10^{-9}$, $2.3 \times 10^{-8}$, $7.7 \times 10^{-6}$ were increased to $2.1 \times 10^{-3}$, $2.2 \times 10^{-2}$ and $4.0 \times 10^{-2}$ $\Omega^{-1}$ cm$^{-1}$,

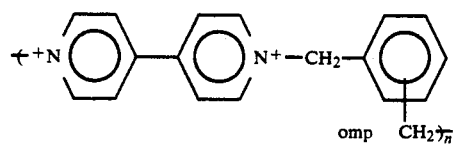

omp CH$_2$)$_n$

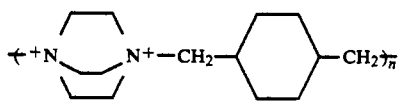

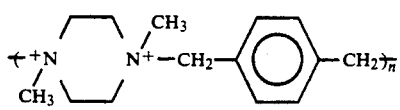

respectively, by constructing complex salts (TCNQ⁰/TCNQ⁻, 1:1) at the same TCNQ loading level as the simple salts. The activation energies for conduction fell from 0.33, 0.30 and 0.25 to 0.069, 0.089 and 0.074 eV, respectively.

Other authors have performed similar comparisons which agree with these observations. For example, R. Oshima et al., *J. Polymer Sci., Part A*, 25, 2343 (1987) prepared the conductive TCNQ anion radical salt of poly(1-histinidium) with a 1:1 stoichiometry.

From known crystal structures and conductivity anisotropy of monomeric salts, it is clear that conductivity arises from the motion of odd $\pi$-electrons among TCNQ sites. The TCNQ molecules are arranged in face-to-face stacks such that $\pi$-orbital overlap within a stack is considerably larger than that between any other near neighbors. Conductivity states arise from the introduction of defects into an ordered ground state configuration induced by an applied potential. The propagation of the electrons is greatest in the direction along the stacks, or normal to the planes of the quinone rings. For simple salts, this process involves an increase in the electrostatic energy, C, but for complex TCNQ salts when both TCNQ$^{-}$ and TCNQ⁰ are present, C and consequently activation energy $E_a$ are much lower and the conductive properties of these salts is several orders of magnitude greater than for simple salts.

A potentially valuable feature distinguishing these TCNQ-polymer salts from other conducting polymers is their solubility in some organic solvents and their ability to form self-supporting films from solution. Despite conductivities as high as $10^{-2}\,\Omega^{-1}\,cm^{-1}$, conductive films composed of TCNQ$^{-}$ and cationic polymers are both isotropic and unstable to moisture, thus severely limiting their practical utility.

The existence of conductive polymers which exhibit anisotropy of the conductivity has only occasionally been reported. For example, M. Watanabe et al. *Polym. J.*, 14, 189 (1982) reported that the TCNQ salts of elastomeric ionenes which contain 4,4'-bipyridilium or 1,2-bis(4-pyridinium) rings exhibited a resistivity of ca.10¹ $\Omega$. These salts could be obtained as flexible films which, when drawn, showed anisotropic conductivity. J. A. Siddiqui et al., *Polymer Comm.*, 28, 90 (1987) reported anisotropic conductivity in oriented films of poly(ethylene oxide)-Na⁺ ion complexes with TCNQ⁻. J. Ulanski et al., *Synthetic Metals*, 35, 221 (1990) reported anisotropic conductivity in films prepared by in situ crystallization of conducting tetrathiotetracene(TCNQ)₂ complexes, in a polyethylene matrix during the film casting procedure. The films are prepared by casting the polyethylene solution containing, i.e., 1% of the dissolved charge transfer complex with zone evaporation of the solvent.

Despite the anisotropic conductivity reported for these materials, a continuing need exists for conductive, film-forming complexes between $\pi$-donors that readily stack in solution so as to exhibit a high degree of $\pi$-orbital overlap, and cationic polymers which enhance the ordered array of the stacked $\pi$-donors to yield anisotropic conductivity. A further need exists for convenient methods to prepare such materials. Such complexes can provide films which can act as self-insulated wires, providing the films are sufficiently resilient.

SUMMARY OF THE INVENTION

The present invention provides dimensionally stable, shaped bodies of an anisotropically conductive complex of the general formula I:

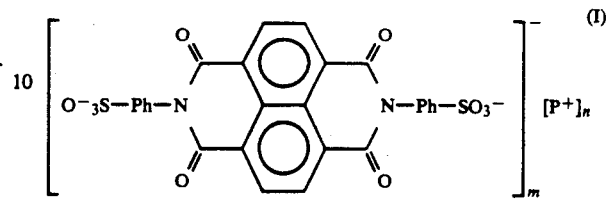

wherein P+ is a cationic polymer having a molecular weight sufficiently high to provide a dimensionally stable body in combination with the radical anion, e.g., having a molecular weight of about $1 \times 10^4 - 5 \times 10^6$, preferably about $3 \times 10^4 - 2 \times 10^6$ and n and m are selected so that the complex is essentially electrically neutral or "uncharged." The cationic polymer, such as the preferred quaternized polyamines, increases the ordering of the sulfonate anion radicals in solution. Electroreduction of solutions of the disulfonate and P+ can be used to precipitate (I) as dimensionally stable, air-stable anisotropic films. The conductivity of the films is electronic and is highly dependent on the humidity of the surrounding atmosphere. For example, the conductivity of a preferred film increases $10^3$ times as the relative humidity above the film is increased from 0% to 90%. Thus, the present complexes could be used as humidity sensors.

Because of the orientation of the $\pi$-stacks, the conductivity is much higher in that plane of a film of the complexes than in the z direction. For example, a thin film of a complex between the radical anion of the compound of formula II, wherein M+ is Na+ and poly(1,1-dimethyl-3-methylenepiperidin-2-ylinium) ("poly(-dimethyl-dialkyl ammonium) ion") exhibits a conductivity ($\sigma$) along the plane of the film ($\delta \parallel$) which is about $10^{4-5}$ times greater than the conductivity across the thin dimension of the film ($\delta \perp$).

The present invention also provides an electrochemical method for the synthesis of compounds of the formula I comprising:

(a) forming an aqueous solution in an electrochemical cell of a compound of the formula (II):

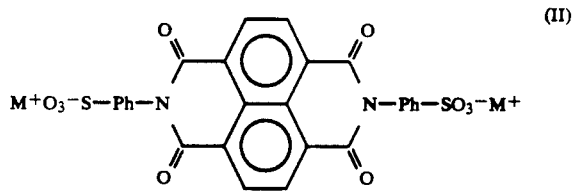

wherein M is a metal ion, preferably an alkali metal cation, most preferably Na+; with an excess of a halide salt of a cationic polymer, preferably the chloride or bromide salt, which polymer solution acts as the supporting electrolyte; and (b) electrochemically reducing the compound of formula II to deposit a dimensionally stable film of the complex of formula I on the cathode of said cell.

The film preferable 10–300 $\mu$m in thickness, can be used in situ, bound to a solid electrode, but is preferably removed from the electrode and employed as a component of an electronic device, where it can function as a self-insulated film, tape or wire.

BRIEF DESCRIPTION OF THE FIGURES

FIG. 2 depicts the ESR spectra of a complex of the invention, (a) perpendicular and (b) parallel to the applied field, at 6° K.

DETAILED DESCRIPTION OF THE INVENTION

Cationic Polymers

Figure 1:
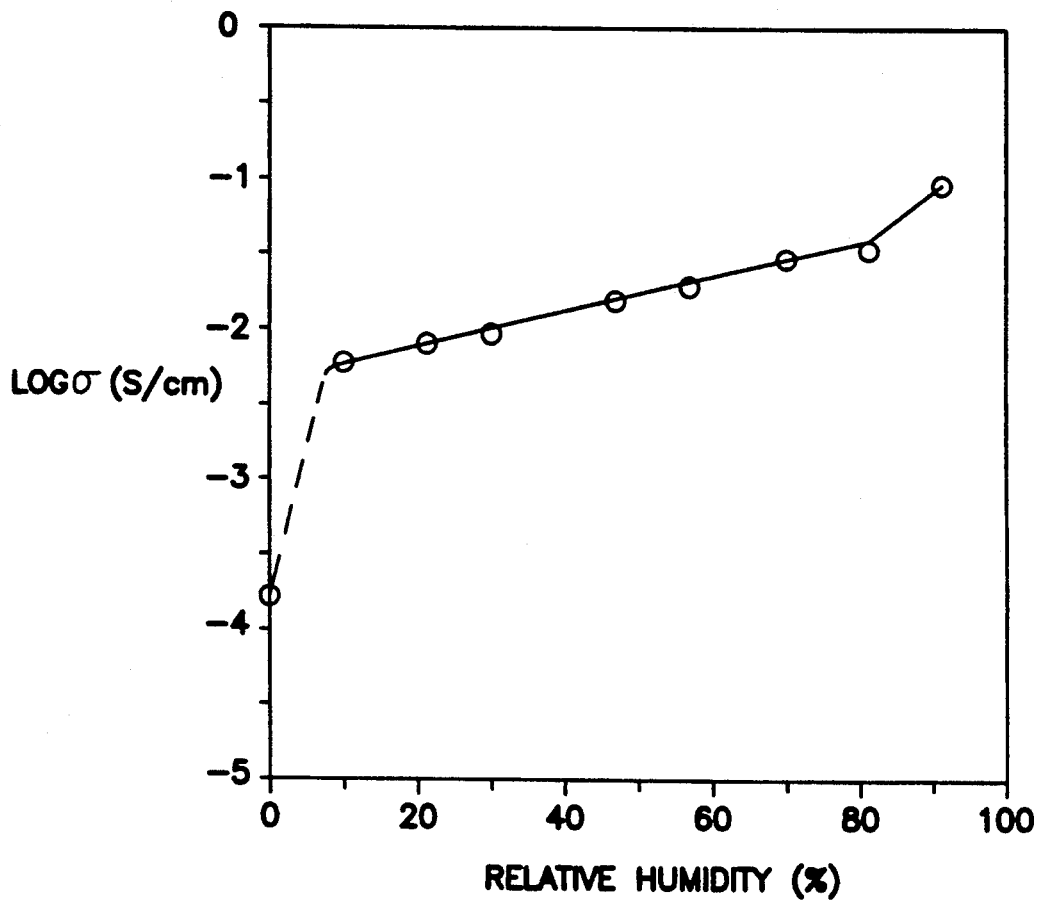
FIG. 1 depicts the conductivity of a complex of the invention as a function of relative humidity.

Cationic polymers [P+] useful in the present invention include cationic polyamines, of molecular weight of about $1 \times 10^4$ to $5 \times 10^6$, which have been quaternized, preferably by reaction with a $(C_1-C_4)$alkylhalide or a $(C_1-C_4)$alkylsulfate, such as methyl iodide, ethyl iodide, methyl chloride, methyl sulfate, and the like, to yield polyammonium ions. Of course, quaternization need not be complete so long as the charges in the final anistropically conductive polymeric body are essentially balanced. Preferably, the polyamines are quaternized to the extent of at least about 15%. The quaternization reaction can be carried out by reaction of a solution of the polyamine in tetrahydrofuran (THF) or nitromethane with the iodide or sulfate at about 20°-30° C. for 8-48 hr, followed by precipitation and drying in vacuo.

Useful polymeric amines include, but are not limited to, the polymers of 4-vinylpyridine, 2-vinylpyridine (atactic and isotactic), N-vinylimidazo, 4-dimethylaminostyrene, alkyleneimines such as ethyleneimine, and copolymers of styrene and butadiene with monomeric unsaturated amines.

Aliphatic quaternary polyamines such as ionenes of the general formula $[-N(Me)_2{}^+-(R^1)-N(Me)_2{}^+-(R^2)-]_p$ can also be employed as the polycations in the present complexes, including those disclosed in Table 1 of R. M. Motovoy et al., *J. Phys. Chem. Solids*, 50, 541 (1989), e.g., wherein $R^1$ and $R^2$ can each be $-(CH_2)_x-$, $-(CH_2)_x-O-(CH_2)_y-$, $-CH_2-C\equiv C-CH_2-$, and the like, wherein x and y are each about 2-10. The ionene counter-ion is preferably a halide, such as Br− or Cl−. Other aliphatic polyamines include those poly(alkylene)alkylamines) of the general formula $(-CH_2-CH-(CH_2NH_3{}^+X^-)-)_n$, wherein X is halide.

Poly(nitrogen-containing heterocyclic rings ("polyheterocyclicamines") can also be used as the polyamines in the present invention, and a number of the salts of these amines are commercially available, including poly(dimethyldiallyl ammonium chloride) (m.w. $=2 \times 10^5$). As noted above, $(C_2-C_4)$alkyl groups can be substituted for the methyl groups used to quaternize the amino groups in all of these polyamines.

N,N-bis(4,-hydroxysulfonylphen-1'-yl)-1,4,5,8-naphthalenetetracarboxylic acid diimide disodium salt (II, M+=Na+).

This disulfonate can be prepared by the reaction of 1,4,5,8-naphthalenetetracarboxylic dianhydride and excess sulfanilic acid, sodium salt hydrate under reflux in a suitable solvent, followed by precipitation of the product II, M+=Na+ by addition of diethyl ether. The sodium ions can be exchanged with other metal ions, such as other alkali metal ions by methods known to the art.

Preparation of radical anion complexes of formula I

To study the aggregation in solution, aqueous solutions of the radical anion of disulfonate salt II, (II−) (preferably about 1-5 mM) were formed by reduction of compounds of formula II with sodium dithionite. These solutions are composed primarily of π-stacked radical anion dimers, which have an absorption maximum of 1140 nm. Addition of an amount of polymer P+ sufficient to balance the charge on the trianion II− leads to a spectrum with NIR absorption maximum characteristic of π-stacks. Thus, the cationic polymer provides a template to organize the dimers into stacks in solution.

The complex of formula I can be precipitated as a solid or deposited as a film by electroprecipitation. For example, an aqueous solution of II (1 mM), with poly(dimethyldiallyl ammonium chloride) (2+, Cl−, 0.1M) present as the supporting electrolyte, was reduced at a platinum electrode. The potential was held at −0.2 V vs. SCE. The current held steady at 0.01 mA cm$^{-2}$ and a shiny film grew on the surface of the cathode. When thin, the film was brown; when thicker, it was black. After drying in vacuum, films 10-50 microns thick are peeled off of the electrode. They are stable in air for many days. XPS analysis confirmed the elemental composition to be consistent with the structure II−, 2+, wherein only traces of sodium are present.

Four-point probe conductivity measurements were made on free-standing films with typical dimensions: x=1 cm, y=1 mm, z=20 micron, at room temperature (ca. 25° C.) in a controlled humidity environment. Using either a standard four-point probe apparatus, or attaching four wires to the sample with silver paste, gave similar steady state values for the x,y-conductivity along the film. At 90% relative humidity, this value was 0.1 S cm$^{-1}$ and did not change after passage of 10 microamp of current through the film for one hour. Conductivity across the thin dimension of the film was measured by attaching wires on each side with silver paste and had a value of about $10^{-7}$ S cm$^{-1}$. Thus, the conductivity is highly anisotropic.

FIG. 1 shows that the in-plane conductivity of the film increases by $10^3$ when the relative humidity is increased from 0 to 90%.

The structural anisotropy was demonstrated by ESR (FIG. 2). When the x,y-plane of the film was placed parallel to the applied field a signal at g=2.0023 (near the free electron value) was observed. Placed perpendicular to the field, a signal at g=2.0044, (shifted by spin orbit coupling to the oxygens) was observed. These results are consistent with a structure in which the stacks of II−, are preferentially oriented toward x,y and give rise to g=2.0023.

The Vis, NIR, IR spectra are in agreement with the proposed structure. In the IR, there is a carbonyl stretching vibration at 1670 cm$^{-1}$, the expected position for imide anion radicals. There is also an electronic transition at 4 microns due to charge-transfer along the stack as expected for a good conductor. Linear dichroism measurements indicated that the average transition dipole of this band is tilted about 17° up from the x,y plane. In the Vis, there is a π-π* band at 437 nm. This wavelength, which is shifted from 480 nm for the monomeric II− in DMF, is also consistent with the proposed π-stack structure, wherein the degree of ordering of the π-stacks of compound II⁻ has been enhanced by the chains of the cationic polymer.

The invention will be further described by reference to the following detailed examples, wherein 1,4,5,8-naphthalenetetracarboxylic dianhydride; sulfanilic acid, sodium salt hydrate; tetrabutylammonium bromide; N,N-dimethylacetamide (DMA) anhydrous (stored over activated 4 Å molecular sieves (MCB)) and dimethylformamide (DMF) anhydrous grade were purchased from Aldrich Chemical Co., Milwaukee, Wis. Tetraethylammonium fluoroborate was obtained from Southwestern Analytical.

Infrared spectra were run on a Perkin-Elmer 1600 FT-IR instrument. NMR spectra were obtained with either an IBM-AC 200 or an IBM-AC 300 instrument. Fast Atom Bombardment (FAB) mass spectra were recorded on a VG 7070E-HF instrument.

Electrochemical experiments were performed using a PAR 173/175/179 potentiostat/programmer/integrator. All potentials are reported vs. saturated calomel electrode (SCE). Electron spin resonance (ESR) experiments utilized a Brucker 300 instrument. In situ radical generation in the ESR cavity used a cell in which a platinum working electrode and a silver wire reference electrode were suspended in a quartz tube with a platinum counter electrode above the other electrodes. ESR spectra of aqueous solutions were run in a one mm quartz capillary with a water volume of 10 $\mu$l. The film was placed in a quartz tube and positioned approximately parallel and perpendicular to the applied field. Visible spectra were run on a Shimaadzu 160 spectrometer and visible near infrared (Vis NIR) spectra came from a Cary 17 instrument. Initial experiments in the NIR used $H_2O$, and showed the interference from OH overtone bands in incompletely balanced cells. Later experiments used $D_2O$, which shifted these overtones to longer wavelength and removed the interference. The limit of the spectrometer scan was 2400 nm and the spectra in aqueous salt solutions extended beyond that wavelength.

EXAMPLE 1.

Preparation of II, M⁺ = Na⁺

1,4,5,8-naphthalenetetracarboxylic dianhydride (0.83 mmol, 0.223 g), sulfanilic acid, sodium salt hydrate (5.0 mmol, 0.974 g), and 6 ml dimethylacetamide (DMA) were added to a 10 ml round bottomed flask equipped with a magnetic stirring, reflux condenser and drying tube containing anhydrous $CaSO_4$. The mixture was stirred at 135° C. under a nitrogen atmosphere for 6 hr. After cooling to room temperature, the reaction mixture was added to 40 ml diethyl ether. The resulting precipitate was filtered, rinsed with diethyl ether (3x, 10 ml) and dried. The crude product was recrystallized from a minimum amount of water. A coral-colored powder was isolated (0.51 g). IR (KBr): 1719 and 1670 (imide C=O), 1552, 1497, 1447, 1402, 1354, 1252, 1198, 1143, 1124, 1045, 1015, 982, 880, 859, 839, 767, 751, 713, 631 cm⁻¹. ¹H-NMR (300 MHz, $D_2O$) 7.56 ppm (d, J=7,4 phenyl H), 7.98 (d,J=7,4 phenyl H), 8.78 (s, 4 naphthyl H). FAB-MS ($H_3PO_4$ matrix) calculated for $C_{26}H_{13}N_2S_2O_{10}$, 577.0008; observed (M−2Na³⁰+H)⁻, 577.0012.

EXAMPLE 2

Preparation of II, M⁺ = Bu₄N⁺.

Compound II (M⁺ = Na) (0.109 mmol, 67.7 mg) was dissolved in 20 ml water and transferred to a separatory funnel containing 20 ml methylene chloride. Tetrabutylammonium bromide (0.218 mmol, 70 mg) was added and the mixture was shaken vigorously off and on over a two-hour period. The organic layer was then drawn off and extracted three times with 10 ml of water, dried ($Na_2SO_4$) and the solvent removed under reduced pressure. Light brown crystals (53 mg) were isolated. IR (KBr) 2960, 2874, 1711, 1671, 1584, 1542, 1489, 1449, 1382, 1253, 1208, 1141, 1117, 1036, 1016, 983, 882, 858, 768, 752, 706, 621 cm⁻¹. ¹H-NMR (200 MHz, $CD_3CN$) 0.95 ppm (t, J=7, —$CH_2CH_2CH_2CH_3$), 1.49 (m, J=7, —$CH_2CH_2CH_2CH_3$) 1.59 (m, J=7, —$CH_2CH_2CH_2CH_3$), 3.07 (t, J=7, —$CH_2CH_2CH_2CH_3$), 7.35 (d, J=8.5, 4 phenyl H), 7.89 (d, J=8.5, 4 phenyl H), 8.74 (s, 4 naphthyl H).

EXAMPLE 3

Anion Radical of II (M⁺ = Na⁺)

Although it was possible to generate the anion radical (II⁻, M⁺ = Na⁺) electrochemically, it was convenient and informative to produce it in the absence of supporting electrolyte using aqueous $Na_2S_2O_4$. Typically, a slight excess of the reducing agent was employed. Under such conditions, the NIR absorption spectrum of the anion radical in $H_2O$ showed a band at 1140 nm ($\epsilon$ 3,900), which was not present in DMF solvent. In addition, the strong visible band was shifted from 473 nm in DMF to 453 ($\epsilon$25,000) in water. The intensity of the NIR band followed Beers Law over the concentration range 0.03 to 5 mM.

The dramatic appearance of a NIR band some 300 nm beyond any band found in DMF solution demonstrates that a different species is present in water. This new species is logically assigned to be a π-stacked radical-anion dimer of II⁻, (M⁺ = Na⁺). Typically, such dimers show new charge-transfer bands at longer wavelength than the monomer. They also show Davydov shifts of visible bands to shorter wavelength. These visible bands of dimers have been assigned as π-π* transitions and the 453 nm band from II⁻(M⁺ = Na⁺) could be assigned similarly. The Beers Law behavior implies that in water essentially all the II⁻(M⁺ = Na⁺) is dimerized at all concentrations studied.

The ESR spectrum of II⁻(M⁺ = Na⁺) in water is slightly different from that found in DMF solution. It can be simulated using splitting from four hydrogens $a_H$ 1.93 G and two nitrogens $a_N$ 1.08 G. It was surprising to find ESR activity from a dimer, since the other dimers have been shown to be diamagnetic. However, a spin count, using a nitroxyl as a standard, showed that about 5% of the anion radicals were ESR active. Thus, it can be proposed that there is some monomer anion radical present and an ESR inactive dimer.

EXAMPLE 4

Preparation of Compound I (P⁺ = Poly(dimethyl-diallyl ammonium ion) (PDDA⁺)

An electrolytic cell was assembled to electroprecipitate a film of the complex (II⁻) (PDDA⁺). The bottom of the cells was covered with mercury to form the working electrode (ca. 40 cm² of exposed surface area) and a platinum wire was immersed in the HG for electrical connection to the potentiostat. The counter electrode was a graphite rod (area: ca. 40 cm²), positioned in a separate compartment of the electrode, having a bottom frit located above the Hg pool. A solution of 0.1 M aqueous NaCl was used to fill the counter electrode compartment. A saturated calomel electrode (SCE) was used as the reference electrode, having a salt bridge for separation from the catholyte, and was also located above the Hg pool.

As a catholyte, an aqueous solution of 20% poly(dimethyl-diallyl ammonium chloride) was added to 150 ml distilled water, to yield a PDDA concentration of about 0.3M. Compound II, $M^+ = Na^+$ (0.3 g) was dissolved into the catholyte to yield a concentration of the disulfonate of about $2.4 \times 10^{-3}$ M. The solution was then deoxygenated with an $N_2$ stream for 2 hours.

Electrolysis was carried out at 4° C. at a controlled potential at the Hg electrode of $-0.3$ V/SCE; the corresponding current is ca. 0.001 mA/cm$^2$. In a typical run, after 240 hours, a film of the complex $(II^-)(PDDA^+)$ precipitated on the surface of the Hg. After electrolysis, the electrolyte was removed from the cell, the film was washed three times with deoxygenated water and dried with an $N_2$ stream. The film was lifted off the Hg pool with tweezers and stored between two glass plates under nitrogen. The structure was confirmed by XPS.

EXAMPLE 5

Preparation of Compound I
($P^+$ = poly(1-ammoniomethyl)ethylene)

An anisotropically conductive thin film of the title compound was prepared in accord with the procedure of claim 4, substituting poly((1-ammoniomethyl)ethylene)chloride for poly(dimethyl-diallyl-ammonium chloride).

EXAMPLE 6

Preparation of Compound I
($P^+$ = Poly((N-methyl)4-vinylpyridine)

An anisotropically conductive thin film of the title compound was prepared in accord with procedures of Example 4, substituting poly(N-methyl-4-vinylpyridinium bromide) for poly(dimethyl-diallyl-ammonium chloride).

EXAMPLE 7

Conductivity of Compound I ($P^+$ = PDDA$^+$)

Four-point probe conductivity measurements were made on free-standing films with typical dimensions: $x = 1$ cm, $y = 1$ mm, $z = 20$ micron, at room temperature in a controlled humidity environment. Using either a standard four-point probe apparatus (Alessi CPS) or attaching four wires to the sample with silver paste gave similar steady state values for the x,y-conductivity along the film. At 90% relative humidity, this value was 0.1 S cm$^{-1}$ and did not change after passage of 10 $\mu$A of current through the film for one hour. Conductivity across the thin dimension of the film was measured by attaching wires on each side with silver paste and had a value of about $10^{-7}$ S cm$^{-1}$. Thus, the conductivity is highly anisotropic.

FIG. 1 shows that the in-plane conductivity increases by 10'when the relative humidity is increased from 0 to 90%. Although it is not surprising that the film takes up water from the atmosphere, it is surprising that hydration improves the conductivity, which is electronic, so dramatically.

The structural anisotropy was demonstrated by ESR (FIG. 2). When the x-y plane of the film was placed parallel to the applied field, an inhomogeneously broadened signal was observed. The inhomogeneity was that consistent with an ensemble of g values ranging from 2.0023 (free spin value) to 2.0044. Placed perpendicular to the field, the signal appeared isotropic at $g = 2.0044$. These observations are consistent with a film structure in which the stacks are preferentially oriented toward the x-y plane.

The Vis, NIR and IR spectra are in agreement with the proposed structure. In the IR, there is a carbonyl stretching vibration at 1650 cm$^{-1}$, the expected position for imide anion radicals. There is also an electronic transition at 2500 cm$^{-1}$ due to charge-transfer along the stack as expected for a good conductor. Linear dichroism measurements indicated that the average transition dipole of this band is tilted about 17° up from the x,y plane. In the visible spectrum, there is a $\pi$-$\pi^*$ band at 437 nm. This wavelength, which is shifted from 480 nm for the monomeric $II^-$ in DMF, is also consistent with the proposed stack structure.

In summary, cationic polymers cause aggregation of the anion radicals of formula II in solution, and when these pre-formed stacks electroprecipitate, they form anisotropic films. The film conductivity is electronic and very dependent on the humidity of the ambient atmosphere. Because of the orientation of the stacks, the conductivity is much higher in the plane than in the z direction.

All publications, patents and patent applications cited hereinabove are incorporated by reference herein. The invention has been described with reference to various specific and preferred embodiments and techniques. However, it should be understood that many variations and modifications may be made while remaining within the spirit and scope of the invention.

What is claimed is:

1. A dimensionally stable body of an anisotropically conductive complex of the formula (I):

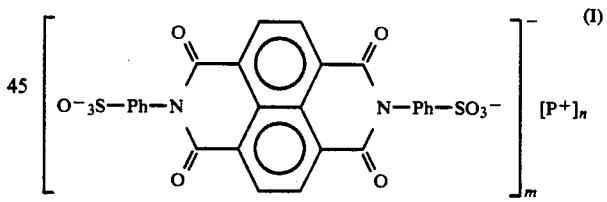

wherein the moiety [p$^+$] is a film-forming cationic polymer, and n and m are selected so that the complex is electrically neutral.

2. The body of claim 1 which is a film.

3. The shaped body of claim 1 wherein [P$^+$] is a polyamine which has been quaternized with a (C$_1$-C$_4$)alkylhalide or a (C$_1$-C$_4$)alkylsulfate.

4. The body of claim 3 wherein the quaternized polyamine is an ionene.

5. The body of claim 3 wherein the quaternized polyamine is a quaternized poly(heterocyclic amine).

6. The body of claim 1 wherein the [P$^+$] is poly(N,N-(C$_1$-C$_4$)dialkyl-3-methylenepiperidin-5-ylinium ion).

7. The body of claim 3 wherein the quaternized polyamine is a quaternized poly(alkylene)alkylamine.

8. A dimensionally stable body of an anisotropically conductive complex of the formula (I):

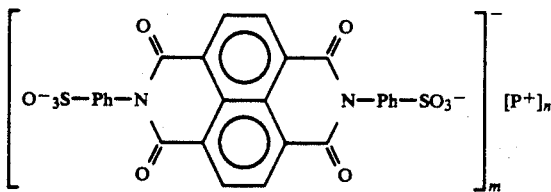

wherein $[P^+]_n$ is polydiallyldimethyl ammonium and wherein m and n are selected so that the complex is electrically neutral.

9. A method for the preparation of a dimensionally stable film of an anisotropically conductive complex of the formula I:

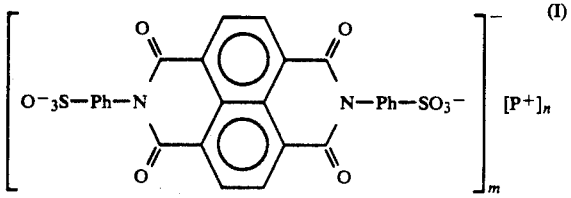

wherein $P^+$ is a film-forming cationic polymer and n and m are selected so that the complex is electrically neutral, comprising:

(a) forming an aqueous solution in an electrochemical cell, of a compound of the formula (II):

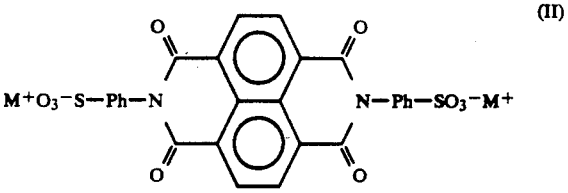

wherein $M^+$ is a metal ion; and an excess of a halide salt of the film-forming cationic polymer; and (b) electrochemically reducing the compound of formula II to deposit a dimensionally stable, anisotropic film of the complex of formula I on the cathode of said cell.

10. The method of claim 9 wherein the film is about 10–300 μm in thickness.

11. The method of claim 9 wherein $M^+$ is an alkali metal cation.

12. The method of claim 9 wherein $M^+$ is $Na^+$.

13. The method of claim 9 wherein $P^+$ is a quaternized polyamine.

* * * * *

UNITED STATES PATENT AND TRADEMARK OFFICE
CERTIFICATE OF CORRECTION

PATENT NO. : 5,272,217

DATED : December 21, 1993

INVENTOR(S) : Larry L. Miller et al.

It is certified that error appears in the above-identified patent and that said Letters Patent is hereby corrected as shown below:

At column 2, line 31, for "TCNQ" read --$TCNQ^0$--

At column 3, line 2, for "TCNQ" read --$TCNQ^{\underline{-}}$--

At column 3, line 26, for "$E_a$" read --$E_a$--

At column 3, line 49, for "TCNQ" read --$TCNQ^{\underline{-}}$--

At column 4, line 8, for "-" read -- $\mp$ --

At column 7, line 62, for "$Na^{30}$" read --$Na^-$--

At column 7, line 67, for "Na" read --$Na^+$--

At column 9, line 61, for "10'" read --$10^3$--

At column 10, line 43 outside the right bracket, for "-" read -- $\mp$ --

At column 10, line 51, for "[p$^+$]" read --[$P^+$]--

UNITED STATES PATENT AND TRADEMARK OFFICE
CERTIFICATE OF CORRECTION

PATENT NO. : 5,272,217

DATED : December 21, 1993

INVENTOR(S) : Larry L. Miller et al.

It is certified that error appears in the above-identified patent and that said Letters Patent is hereby corrected as shown below:

At column 11, line 3, for "-" read -- ÷ --

At column 11, line 22, for "-" read -- ÷ --

Signed and Sealed this

Seventh Day of May, 1996

Attest:

BRUCE LEHMAN

Attesting Officer

Commissioner of Patents and Trademarks